March 4, 1969

JAMES E. WEBB
ADMINISTRATOR OF THE NATIONAL AERONAUTICS
AND SPACE ADMINISTRATION
HEAT SHIELD OVEN
Filed Jan. 20, 1966

3,431,397

INVENTOR
*LLOYD D. BECKERLE*

BY

ATTORNEYS

United States Patent Office 3,431,397
Patented Mar. 4, 1969

3,431,397
HEAT SHIELD OVEN
James E. Webb, Administrator of the National Aeronautics and Space Administration, with respect to an invention of Lloyd D. Beckerle, Los Alamitos, Calif.
Filed Jan. 20, 1966, Ser. No. 521,996
U.S. Cl. 219—347                                2 Claims
Int. Cl. H05b 3/02, 1/00; F24h 9/02

ABSTRACT OF THE DISCLOSURE

A heating oven for uniformly distributing heat over the surface of an article of unusual or irregular configuration, said oven comprising a rigid body of laminated glass fiber sheets affixed to one another by adhesive means and conforming to the shape of the irregular article to be heated. A heat reflective metal foil covers the surface of the rigid body to be disposed proximate the irregular article and protects the fiber glass structure from radiant heat from a plurality of heat lamps affixed at spaced points to the body and adjacent the heat reflective covering which is disposed between the heat source devices and the laminated body. The heat lamps are disposed to uniformly distribute heat over the surface of the article and are affixed to the fiber glass body by thermally insulating and supporting socket means which also clamp the foil material to the body at spaced points. Between the spaced points an insulating air space is formed between the metal foil and the glass fiber body to prevent heat absorption by the glass fiber body.

---

The invention described herein was made in the performance of work under a NASA contract and is subject to the provisions of section 305 of the National Aeronautics and Space Act of 1958, Public Law 85–568 (72 Stat. 435; 42 U.S.C. 4257).

This invention relates to heating ovens. More particularly, it pertains to heat treating ovens for use with articles of irregular or unusual configuration.

Numerous products or parts therein must, prior to or upon completion of their fabrication, undergo a heat treating process for a variety of reasons such as to dry paint coatings or ceramic portions, harden or anneal metals, or merely to test the product for heat insulation and endurance purposes. A problem associated with this procedure is that of achieving an even distribution of heat over the surfaces of the product or article, this frequently being required regardless of the reason for which the heating is intended. An effective approach to the problem is to fabricate the oven itself in the form of the article so that heat source lamps on the oven's internal surface may be equidistantly placed on it. When the article is particularly irregular in its configuration, however, as for example the external shape of a manned space vehicle, the cost of fabricating a specially shaped oven by conventional methods such as stretch pressing, spinning, or explosive forming becomes so great as to almost be prohibitive. Therefore, alternative fabrication techniques for specially shaped ovens have been practiced. One of these is the use of a plurality of oven sections which may be affixed to each other in a variable and interchangeable manner so as to "build" the oven to the desired shape. An example of the interchangeable section oven is shown in U.S. Patent No. 2,610,280 wherein a plurality of elongated trough-like lamp reflectors are hingedly connected to each other. By merely moving the troughs with respect to one another a variety of oven shapes may be achieved. U.S. Patent No. 2,688,684 shows another form of the articulated section oven in which the numerous sections may be affixed to one another to conform to the product shape. The ability of such ovens to adapt to numerous shapes, particularly those with flat or planar surfaces, makes their applications obviously flexible. Their effectiveness for uniform heat distribution is significantly reduced when used on product shapes having surfaces curved in a plurality of planes because the oven shape does not conform thereto.

In view of the above, the present invention is directed to an oven and the construction thereof for evenly distributing heat over the surfaces of irregular or unusually shaped objects. Due to constructional features of the oven, it is economically feasible to build it to the specific shape of the product, thus insuring even heat distribution. This not only contributes to the quality and reliability of the product itself but enables greater flexibility in its design. Briefly, it is constructed of a plurality of Fiberglas body sections formed by use of conventional molding techniques. The Fiberglas body is lined on the inside with a heat reflecting material such as aluminum foil, the latter being affixed to the body by the stand-off insulator of the lamp socket structures. Due to the tendency of the foil to lie in spaced relation from the Fiberglas at areas intermediate the socket structures, there is provided a "dead air" space which, in addition to the foil insulates the body from the heat, thereby increasing high temperature capability of the oven over more extended periods of time. Additional features and advantages of the invention are described hereafter for exemplary purposes in conjunction with and application to the heat shield portion of a space vehicle because of its unusual shape. Although the oven described and shown in the drawings is in the shape of such an object it is evident that the principles and method of construction are applicable in the fabrication of other articles of unusual or irregular configuration. In view thereof reference is made to the accompanying drawings in which like reference numerals designate like parts in the figures, and wherein:

Figure 1:
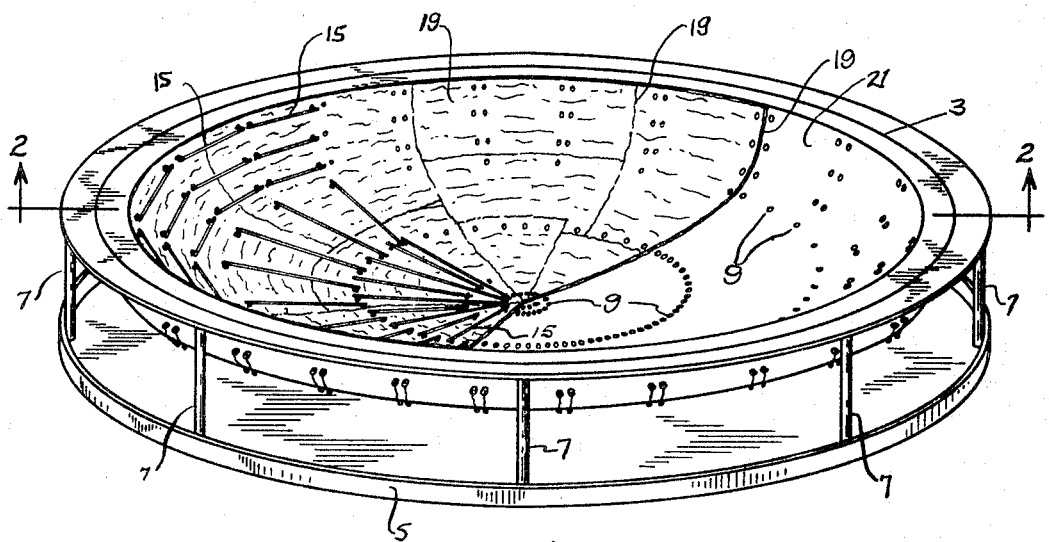
FIG. 1 is a perspective view of a typical oven section showing a side and an internal portion thereof.
Figure 2:
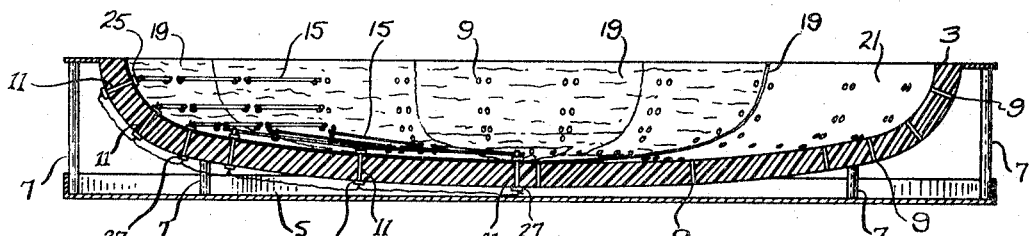
FIG. 2 is a sectional view through the plane 2—2 of FIG. 1.
Figure 3:
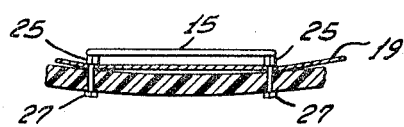
FIG. 3 is a sectional view similar to FIG. 2, but showing the spacing between the laminated fiber body and the heat reflective covering affixed thereto.

The aforementioned space vehicle requires, in its course of construction, a series of environmental heating tests of construction, a series of environmental heating tests in order to determine certain limitations and standards. The vehicle, includes an upper substantially conical portion and a lower somewhat cycloid shaped portion, is enclosed in oven sections which conform to these shapes. It is the lower oven section which, due to its irregular form, that the present example is particularly directed. Thus in FIG. 1 there is shown the bottom section of an oven which conforms to the shape of a space vehicle heat shield. In fabricating such an oven section from a glass fiber material a supporting mold must first be constructed. This may be done in any of several well-known ways such as building of a wooden or metal form in the article (heat shield) shape, and evenly covering the form with plaster, clay, or other paste-like substance to form a mold which sets to a sufficient load supporting strength. In certain instances it may be feasible to build the mold directly over the article thus avoiding the necessity to construct the form. This would depend, however, on the particular product, its shape, cost and other such factors. After the mold of the article has set, it is removed from the form and placed in stable position for receipt of the glass fiber layers. A coating of wax or other release agent is applied to the mold first in order to easily remove the Fiberglas after it has dried. The first layer of glass fiber material is then positioned over the surface of the mold and coated with any conventional Fiberglas hardening and bonding resin. A subsequent glass fiber layer is positioned thereover and the coating procedure repeated. The alternate application of Fiberglas cloth or material and resin coating is continued until the desired thickness is achieved which, in the instant case, is approximately five-eighths (⅝″) inch. After the laminated layers of material have cured, as in the form of body 3, it is removed from the mold, inverted, and mounted on a supporting fixture 5, see FIG. 1. The body 3 of the oven may then be supported at appropriate structural points depending upon its overall configuration. Where, for example, its cross sectional form is that of a cycloid, as shown in FIG. 2, the fixture 5 may support it at a plurality of points such as by arms 7 which extend therefrom.

Once the oven body has been positioned on the fixture a plurality of holes 9 are drilled through the former so as to receive the lamp sockets 11 which are inserted therethrough and electrically connected subsequently in any desired manner. The number of sockets and their particular arrangement in the oven will generally vary in accordance with the intended heat input and the particular shape of the oven. As shown in the drawings, uniform heat distribution over the surface of a cycloid like surface is best achieved by locating several banks of heat lamps 15 horizontally on the oven wall and by arranging others in a radial manner at positions nearer the center.

Since the Fiberglas body absorbs heat and ordinarily would decompose at high temperatures (above 500° F.) over extended periods, a heat reflective lining 19 is placed over the internal surface 21 thereof. The lining may comprise a plurality of triangular or other appropriately cut sheets of thin (.005 inch thick) aluminum or other foil which are simply laid against the surface and formed to the shape thereof by the application of hand pressure. As shown in FIG. 1 where the surface 21 is only partially covered, the sheets of lining 19 remain in fixed relative position to the surface. Holes are punched through the sheets in aligned relation to the body holes 9. The sockets 11 are then inserted and the sheets affixed to the body by conventional stand-off insulators 25 or socket means which act as clamp-like members. A ceramic nut 27 or other insulative means is affixed to the bottom end of the sockets 11 to hold them in position. It is pointed out that the stand-off insulators 25 retain the foil covering against the internal surface 21 of the body only at their point of contact with it and that in the area between the sockets the foil tends to raise 1/16 to ⅛ inch above the surface 21. This space (not shown) thus acts as an insulator and assists in the prevention of heat absorption by the Fiberglas body, thus increasing its operational life. In order to increase oven life even still further an insulating material may be placed intermediate the body and the aluminum foil.

It should be understood that the present disclosure and accompanying figures relate only to a preferred embodiment of the invention and that it is intended to cover all changes and modifications of the above example which do not constitute departures from the spirit and scope of the invention. Thus it is apparent that materials other than glass fiber cloth such as for example a plastic, may be used in forming the oven base. Similarly any of a variety of metal foils which have good heat reflective characteristics, such as gold or stainless steel, may be used in place of aluminum. Likewise, a heat reflective paint or other coating could be substituted therefor.

In view thereof, that which is claimed and desired to be secured by Letters Patent is:

1. A device for uniformly distributing heat over the surface of an article of unusual or irregular configuration comprising:
   a rigid body of laminated fibrous sheets affixed to one another in unitary form by an adhesive means, said body conforming to the shape of said article;
   a heat reflective covering over the surface of said rigid body to be disposed proximate said article, said heat reflective covering being a metal foil material affixed to said body at spaced points thereon in spaced relation thereto and providing an insulating space between said metal foil material and said body; and a plurality of
   heat source means affixed to said body adjacent to and spaced from said heat reflective covering by thermally insulating support means with said heat reflective covering disposed between said heat-source means and said body, said heat source means being disposed to uniformly distribute heat over the surface of the article which conforms to the shape of said rigid body.

2. The device for uniformly distributing heat over the surface of an article of unusual or irregular shape as recited in claim 1, wherein said rigid body is comprised of laminated sheets of glass fiber material and said heat source means includes heat lamp means and supporting socket means therefor affixed to said rigid body, said socket means also affixing said metal foil material to said rigid body.

References Cited

UNITED STATES PATENTS

| | | | |
|---|---|---|---|
| 1,666,831 | 4/1928 | Pandolfo | 219—347 |
| 2,742,387 | 4/1956 | Giuliani | 343—18 X |
| 2,747,180 | 5/1956 | Brucker | 156—242 X |
| 2,765,248 | 10/1956 | Beech et al. | 156—245 X |
| 2,907,873 | 10/1959 | Smith | 240—103 |
| 3,030,259 | 4/1962 | Long | 156—245 |
| 3,319,062 | 5/1967 | Falk | 240—103 |
| 3,320,341 | 5/1967 | Mackie | 156—245 X |

FOREIGN PATENTS 982,957  2/1965  Great Britain.

ANTHONY BARTIS, *Primary Examiner.*

U.S. Cl. X.R.

126—270; 156—245; 219—357, 461, 535; 264—136; 350—288